Patented Nov. 27, 1923.

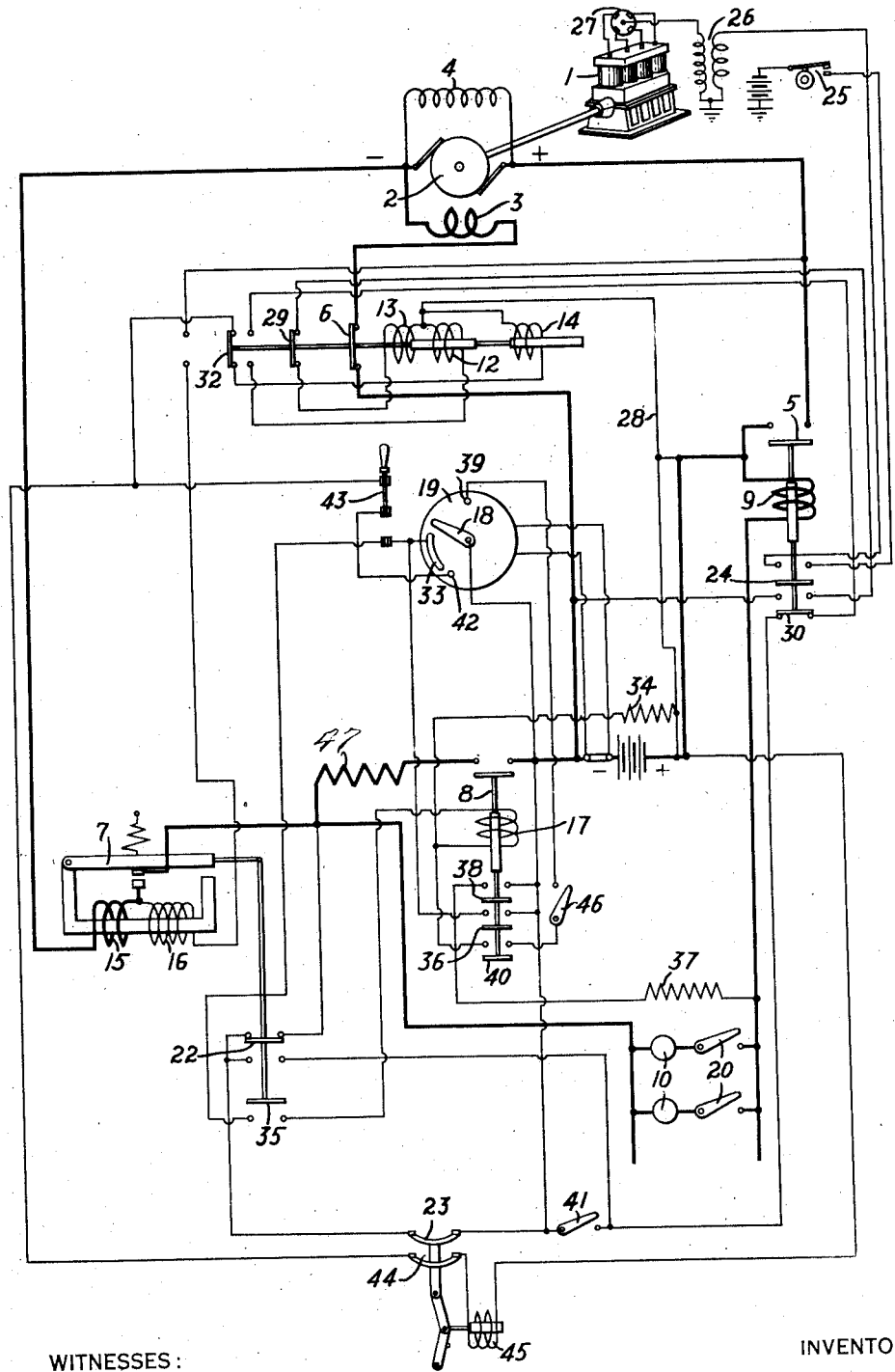

1,475,746

UNITED STATES PATENT OFFICE.

ALBERT M. CANDY, OF WILKINSBURG, PENNSYLVANIA, ASSIGNOR TO WESTINGHOUSE ELECTRIC & MANUFACTURING COMPANY, A CORPORATION OF PENNSYLVANIA.

AUTOMATIC LIGHTING SYSTEM.

Application filed November 3, 1916. Serial No. 129,283.

*To all whom it may concern:*

Be it known that I, ALBERT M. CANDY, a citizen of the United States, and a resident of Wilkinsburg, in the county of Allegheny and State of Pennsylvania, have invented a new and useful Improvement in Automatic Lighting Systems, of which the following is a specification.

My invention relates to automatic lighting systems and particularly to such systems as embody internal-combustion engines that are controlled automatically in accordance with circuit conditions.

My invention has for its object to provide a system of the character indicated above that shall be entirely automatic in its operation to effect the starting of an internal-combustion engine upon the closing of a lighting circuit and upon a decrease in the charge of a battery to a predetermined degree.

In a system constructed in accordance with my invention, an internal-combustion engine is employed as a prime mover for a dynamo-electric machine that operates either as a generator or as a motor. A storage battery is employed to supply energy for operating the dynamo-electric machine as a motor for starting the engine and for supplying energy to the control circuits for actuating the several electromagnetic switches. The battery may be of relatively small capacity since the lighting circuit is supplied directly from the generator upon the closing of a circuit for any one of the several lamps of the system.

Automatic means, preferably in the form of an ampere-hour meter, controls the operation of the system in such manner that the prime mover is automatically started to operate the generator, and a charging circuit for the battery is completed when the charge of the latter falls below a predetermined degree. Safety devices are provided in order that the battery may not be discharged below a predetermined degree in case the internal-combustion engine fails to start or the voltage of the generator does not reach a value sufficient to effect the opening of the starting circuit.

The details of my invention will be described in connection with the accompanying drawing, in which the single figure is a diagrammatic view of circuits and apparatus embodying my invention.

Referring to the drawing, an internal-combustion engine 1 is directly connected to a dynamo-eleectric machine 2 which operates either as a motor to effect the starting of the engine or as a generator for supplying energy to a lighting system. The generator 2 has a series field-magnet winding 3 and a shunt field-magnet winding 4. The series field-magnet winding 3 is energized only during the operation of the dynamo-electric machine as a motor to start the engine.

The external circuits of the dynamo-electric machine 2 are controlled by electromagnetically operable switches 5, 6, 7 and 8. The switch 5 is provided with an actuating coil 9 that is in series with lamps 10. The lamps 10 are in parallel relation to each other and in series with the source of current. The switch 6 is provided with actuating coils 12 and 13 for respectively effecting the closing and the opening of the switch. A coil 14 also operates to effect the opening of the switch under predetermined conditions to be later described.

The switch 7, which is of the reverse-current relay type, has a series actuating coil 15 and a shunt actuating coil 16. The switch 8 has an actuating soil 17 that is energized in accordance with the position of the indicating arm 18 of an ampere-hour meter 19.

The several switches and the interlocks connected thereto are illustrated in their normal or inoperative positions when the engine and generator are at rest and all of the switches 20 for controlling the respective lamp circuits are open. It may be assumed that it is desired to close the circuit of one of the lamps 10. The corresponding switch 20 is closed and a circuit is completed which extends from the positive terminal of the battery through actuating coil 9 of switch 5, switch 20, lamp 10, interlock 22, and relay 23, to the negative terminal of the battery.

The switch 5 then closes to complete a circuit for the operation of the dynamo-electric machine as a motor. This circuit extends from the positive terminal of the battery, through switch 5, armature 2, series field-magnet winding 3 and switch 6, which is normally closed, to the negative terminal of the battery. The closing of switch 5 effects the closing of an interlock 24 mechanically connected thereto for controlling the ignition circuit of the gas engine. The ignition circuit comprises a battery, an interrupter 25, an induction coil 26 and a distributer 27. The dynamo-electric machine 2 now operates as a motor to crank the engine.

When the engine operates under its own power, the dynamo-electric machine is driven as a generator at a rapidly increasing speed. When the speed of the generator is such that the voltage generated by it exceeds that of the battery by a predetermined amount, the switch 6 is opened by the energizing of coil 13. The energizing circuit for the latter coil extends from the positive side of the battery, through conductor 28, coil 13, interlock 29 and interlock 30, to the negative side of the battery. The opening of switch 6 effects the actuation of interlocks 29 and 32 to their respective left-hand positions.

The interlock 32 completes a circuit which extends from the positive terminal of the generator, through interlock 32 and coils 16 and 15, to the negative terminal of the generator. When the voltage of the generator reaches a value corresponding to that for which the lamps 10 are adapted, which may be, for example, 32 volts, the coils 15 and 16, which normally assist each other, effect the closing of switch 7. The lamp 10 is then connected directly in circuit with the generator. The closing of switch 7 lowers interlock 22 to open the circuit initially established for actuating coil 9 of switch 5. The current furnished to the lamp by the generator is of such value as to hold the switch 5 and interlock 24 in their closed positions. Additional lamps may be connected in circuit, as desired.

When all of the switches 20 for controlling the lamp circuits are opened, coil 9 of line switch 5 is deenergized and the latter opens. The ignition circuit of the engine is opened by interlock 24 simultaneously with the opening of switch 5. The interlock 30 is now in its illustrated position to complete a circuit which extends from the positive side of the battery through conductor 28, coil 12 of switch 6, interlock 29, interlock 30, interlock 22, which is in its lower position, and relay 23 to the negative side of the battery. The switch 6 is then actuated from its open to its closed position by coil 12 in readiness for the completion of the succeeding starting operation which occurs upon the subsequent closing of one of the switches 20 in the lamp circuits.

In case the battery has been discharged, during a starting operation, to such degree that the indicator or pointer 18 engages a contact segment 33, the closing of switch 7, when the voltage of the generator reaches its normal value, closes interlock 35 and the latter establishes a circuit which extends from the positive terminal of the battery, through resistor 34, coil 17, interlock 35, contact segment 33 and arm 18, to the negative side of the battery. The energizing of coil 17 by the circuit above traced effects the closing of switch 8 to establish the charging circuit of the battery.

As the charging operation proceeds, the arm 18 moves in a clockwise direction. The disengagement of the arm 18 and the contact segment 33 does not open the circuit of coil 17 since a circuit for connecting these contact members is completed by interlock 36 that is mechanically connected to the switch 8. The switch 5 is retained in its closed position, even though all of the lamps are turned off, while the switch 8 is closed by reason of the fact that the actuating coil 9 of the former switch is energized by a circuit which extends from the positive terminal of the battery, through coil 9, resistor 37, and interlock 38, to the negative side of the battery.

It will be noted, from the operation of the system described above, that the engine and generator continue to operate automatically to charge the storage battery even though all of the switches 20 for controlling the lamp circuits are open. The charging operation continues until the arm 18 of the meter 19 engages contact member 39, whereupon a shunt circuit for de-energizing the coil 17 is completed. This circuit extends from the lower terminal of coil 17 through interlock 40, switch 46, contact member 39, pointer 18 and interlocks 36 and 35, to the upper terminal of coil 17. The switch 8 then opens, and the circuits controlled by the interlocks 36 and 38 are opened also to effect the de-energizing of coil 9 of line switch 5.

The opening of the ignition circuit by the interlock 24 effects the stopping of the engine. The coil 12 is energized in the manner described above in connection with the opening of the main circuit to effect the closing of switch 6 in preparation for the succeeding starting operation. The switch 7 opens when the generator voltage falls below the predetermined value. All of the switches are now in their respective normal or inoperative positions.

The switch 7 operates automatically to prevent reversal of the direction of flow of current through the generator circuit from any cause such as, for example, failure of the engine during its normal operation or opening of the generator shunt field circuit. The coils 15 and 16 normally assist each other, but the series coil 15 opposes the coil 16 when current flows through the former in the reverse direction. When the generator voltage has a value less than that of the battery through resistor 47, the coil 16 is not energized sufficiently to retain the switch 7 in its closed position.

The opening of switch 7 insures that switch 8 is also opened, if the latter is in its closed position, by reason of the fact that interlock 35 opens the circuit of actuating coil 17. Line switch 5 remains closed, however, so long as any one of the lighting switches 20 is closed because interlock 22 maintains a circuit which extends from the positive side of the battery, through coil 9, switch 20, lamp 10, interlock 22 and relay 23, to the negative side of the battery.

When switch 7 is open and interlock 22 is in its upper position and all of the switches 20 are opened, line switch 5 opens because the circuit of coil 9 through the lamps 10 is broken at the switches 20, and the circuit of coil 9 through resistor 37 is open at interlock 38. Under such conditions, the switch 6 does not close because the circuit of the closing coil 12 is open at interlock 22. It is necessary to first remove the cause of reverse-current conditions and then to momentarily close manually operable switch 41. Switch 6 is then closed, if switch 5 has previously opened, by means of a circuit which extends from the positive side of the battery, through coil 12, interlock 29, interlock 30 and manually operable switch 41, to the negative side of the battery. The arrangement whereby the circuit of coil 12 is open at interlock 22 prevents the connection of the battery to the dynamo-electric machine for restarting the engine after the occurrence of a reverse flow of current.

In case the engine fails, for some reason, to start during the operation of the dynamo-electric machine as a motor, or the engine fails to drive the dynamo-electric machine as a generator at a sufficiently high speed to effect the opening of switch 6, the battery will become completely discharged unless some safety means is provided. In the event of the occurrence of the above or similar conditions, and the discharge of the battery proceeds until the pointer 18 rotates in a counter-clockwise direction into engagement with a contact member 42, two circuits are completed. The first circuit extends from the positive side of the battery, through safety opening coil 14, interlock 32, manually operable switch 43, contact member 42 and pointer 18, to the negative side of the battery. The coil 14 is energized by the circuit above described to effect the opening of switch 6 to disconnect the battery from the dynamo-electric machine.

The second circuit, which is completed by the pointer 18, extends from the positive side of the battery, through tripping coil 45, interlock 44, switch 43, contact member 42 and pointer 18, to the negative side of the battery. The coil 45 effects the opening of circuit-breaking relay 23. The opening of switch 6 and the relay 23 entirely disconnects the battery from both the generator and the lighting mains.

When the cause of trouble has been removed, the switch 43 must be opened and the relay 23 must be closed, after which one of the switches 20 must be closed, whereupon the system will operate automatically in the usual manner. After the system is in operation and the switch 7 has been closed, manually operable switch 43 will be actuated to its lower position to effect the closing of switch 8 by means of a circuit which extends from the positive side of the battery, through resistor 34, coil 17, interlock 35, switch 43, contact member 42 and pointer 18, to the negative side of the battery.

Immediately upon the closing of switch 8 and the movement of the pointer 18 out of engagement with contact member 42, the switch 43 will be manually actuated to its upper position, whereupon the charging of the battery will proceed in the usual manner until the pointer 18 engages contact member 39, as previously described.

It is desirable to give a storage battery equalizing charges or overcharges, at intervals of approximately one or two weeks, in order to maintain it in its proper condition. To effect this operation, it is only necessary to open a manually operable switch 46 that is in circuit with contact member 39 in order to prevent the automatic opening of switch 8 when the contact member 39 is engaged by the pointer 18. The charging operation then proceeds to such point as may be considered desirable.

By means of the arrangement above described, I am enabled to automatically supply energy to a lighting system without the employment of a storage battery of large capacity. It is only necessary to complete the circuit of any one of the lamps of the lighting system in order to initiate the operation of the prime mover for driving the generator.

The battery, which is employed for furnishing current for operation of the dynamo-electric machine as a motor to start the engine and to supply energy for the control circuits, is automatically charged when its energy has been discharged to a predetermined degree. The charging operation is automatically interrupted when a sufficient quantity of energy has been stored in the battery.

Means are provided whereby excessive discharge of the battery and damage thereto are effectually prevented in case abnormal conditions occur with regard to the starting of the engine or the operation of the generator. Normal conditions may be restored by the manipulation of the manually operable devices under the control of the operator.

I claim as my invention:

1. In an electrical system, the combination with an internal-combustion engine, a dynamo-electric machine, a battery and a pair of contact members arranged to make contact when said battery is charged below a predetermined amount, of a plurality of switches for connecting said battery in circuit with said dynamo-electric machine when said battery is charged below a predetermined amount, said switches having actuating coils, a relay connected to each of said switches, the circuit of the actuating coil of one of said switches including said contact members and the relay connected to another of said switches, the circuit of a third one of said switches including the relay connected to said first switch, and the relay connected to said third switch controlling the operation of said engine.

2. In an electrical system, the combination with a dynamo-electric machine and a battery, of means comprising a pair of line switches for electrically connecting them, said switches having respectively normally open and closed positions, and means whereby said closed switch is automatically opened when the battery discharges to a predetermined degree.

3. In an electrical system, the combination with a translating device, a source of energy therefor and a dynamo-electric machine, of a normally open switch, a normally closed switch, a relay connected to each of said switches, means for establishing a circuit including said source, said translating device and the relay of said first switch when said first switch occupies its normally open position, means for connecting said source to said dynamo-electric machine through said other switch, means for opening said other switch under predetermined conditions, the relay connected to said other switch then causing the closing of said first switch to connect said dynamo-electric machine in circuit with said translating device and means for establishing a circuit including said relays when said normally open switch is closed and said normally closed switch is open to cause said switches to return to their normal positions.

4. In an electrical system, the combination with a translating device, a source of energy therefor and a dynamo-electric machine, of a pair of switches, a relay connected to each of said switches, means for establishing a circuit including said source, said translating device and the relay connected to one of said switches, means for connecting said source to said dynamo-electric machine, and means for opening said other switch under predetermined conditions, the relay connected to said other switch then causing the closing of said first switch to connect said dynamo-electric machine to said translating device.

In testimony whereof, I have hereunto subscribed my name this 27th day of Oct., 1916.

ALBERT M. CANDY.